United States Patent [19]

Miller, Sr.

[11] Patent Number: 4,473,815

[45] Date of Patent: Sep. 25, 1984

[54] BATTERY CONTROL AND ALARM SYSTEM FOR VEHICLES

[76] Inventor: Richard C. Miller, Sr., 1156 Crahen Ave., NE., Grand Rapids, Mich. 49506

[21] Appl. No.: 320,548

[22] Filed: Nov. 12, 1981

[51] Int. Cl.³ .............................................. B60R 25/04
[52] U.S. Cl. ...................................... 340/64; 180/287; 307/10 BP; 361/196
[58] Field of Search ........................... 340/54, 63, 64; 307/10 AT, 10 LS, 10 BP; 315/80; 361/196; 180/287

[56] References Cited

U.S. PATENT DOCUMENTS

| | | | |
|---|---|---|---|
| 2,751,507 | 6/1956 | Crum | 307/10 BP |
| 2,847,656 | 8/1958 | Ricks . | |
| 3,021,429 | 2/1962 | Starck | 307/10 BP |
| 3,222,534 | 12/1965 | Scott . | |
| 3,492,494 | 1/1970 | Clark et al. . | |
| 3,569,928 | 3/1971 | Avallone . | |
| 3,626,239 | 12/1971 | Brock | 307/10 LS |
| 3,792,435 | 2/1974 | Pace et al. . | |
| 3,885,164 | 5/1975 | Vest | 180/287 X |
| 3,993,914 | 11/1976 | Conrad et al. | 307/10 LS |
| 4,194,175 | 3/1980 | Eklund | 361/196 X |
| 4,206,439 | 6/1980 | Steinitz . | |
| 4,218,717 | 8/1980 | Shuster | 307/10 BP |
| 4,220,947 | 9/1980 | Yamamoto . | |
| 4,302,747 | 11/1981 | Belmuth | 340/64 |

*Primary Examiner*—David L. Trafton
*Attorney, Agent, or Firm*—Price, Heneveld, Huizenga & Cooper

[57] ABSTRACT

A battery control and alarm system for a vehicle electrical system including a first, normally open, solenoid-actuated switch connected in series with the main battery cable; a second, magnetically actuated reed switch proximate the vehicle ignition switch and connected to the battery; and circuitry to close the first switch when the second switch is closed and for a limited delay period after the second switch is opened. In a preferred embodiment, the system includes a third, magnetically actuated reed switch and circuitry to both sound the vehicle horn and close the first switch when the third switch is closed.

13 Claims, 2 Drawing Figures

BATTERY CONTROL AND ALARM SYSTEM FOR VEHICLES

BACKGROUND OF THE INVENTION

The present invention relates to a battery control and alarm system for vehicles such as automobiles.

An automobile battery can be excessively, and even totally, drained if accessories drawing current from the battery are left operating after the engine, driving the alternator or generator, has been stopped. To partially reduce the possibility of so draining the battery, warning systems and delay systems have been developed to sound an alarm when the headlights are left on after the motor has stopped and to automatically turn the headlights off after a given delay period. However, these warning and delay systems typically require relatively complex and expensive circuitry to effect their implementation and cannot conveniently be installed as an aftermarket item or transferred from vehicle to vehicle. Further, such warning and delay systems have generally been used in conjunction only with the headlights, and not the other accessories on a vehicle. Consequently, it is possible that one of these other accessories, such as the interior lights, might be left operating after the motor has been stopped, thereby discharging the vehicle battery.

Automobile theft has reached epidemic proportions in some areas of the country and, accordingly, systems have been developed to sound an alarm if one attempts to enter or start the vehicle without first disarming the system using a special device or code. These protective systems are generally classified into two groups—the first group having a switch on access doors to the vehicle to sound an alarm if any of those doors are opened, and the second group requiring a special ignition key to complete an electrical connection necessary to start the vehicle. These protective systems have significant drawbacks. First, such systems typically do not provide a switch manually operable from inside or outside of the vehicle which one may actuate to sound the alarm system when he believes himself to be in danger. Further, the systems utilizing a special key require complex and, consequently, expensive circuitry.

SUMMARY OF THE INVENTION

The aforementioned problems are solved by the present invention. Essentially, a battery control system is provided for an automotive electrical system having a current source and a cable for conducting current from the current source. The battery control system includes a first, normally open switch having a first enablement terminal such that the first switch closes upon the application of current to the first enablement terminal. This first switch is connected in series with the battery cable. The system further includes a second, normally open switch connected in series between the current source and the first enablement terminal, structure activatable by the vehicle driver for closing the second switch, and structure for delaying opening of the first switch for a predetermined time period after deactivation of the second switch. Because the first switch is normally open, the entire automotive electrical system, and not merely the headlights, is disabled after the predetermined delay period has expired. Consequently, the battery cannot become discharged during periods of vehicle inactivity. The delaying structure causes the first switch to remain closed for a predetermined delay period so that accessories such as exterior and interior vehicle lights can be left on after the driver exits the car so that the driver may have safe access to a building.

In a preferred embodiment of the invention, the system includes a third switch connected in series between the current source and both the first enablement terminal and the vehicle horn and structure activatable from the vehicle exterior for closing the third switch. Consequently, one may close the third switch, sounding the horn and actuating vehicle accessories left on whenever he believes himself to be in danger.

In another preferred embodiment of the invention, a fourth switch activatable from the vehicle exterior is also provided so that one about to enter the vehicle may actuate the vehicle interior lights if left on to insure that no intruder is hiding in the vehicle.

These and other objects, advantages and features of the invention will be more fully understood and appreciated by reference to the written specification and appended drawings.

DESCRIPTION OF THE PREFERRED EMBODIMENT

Figure 1:
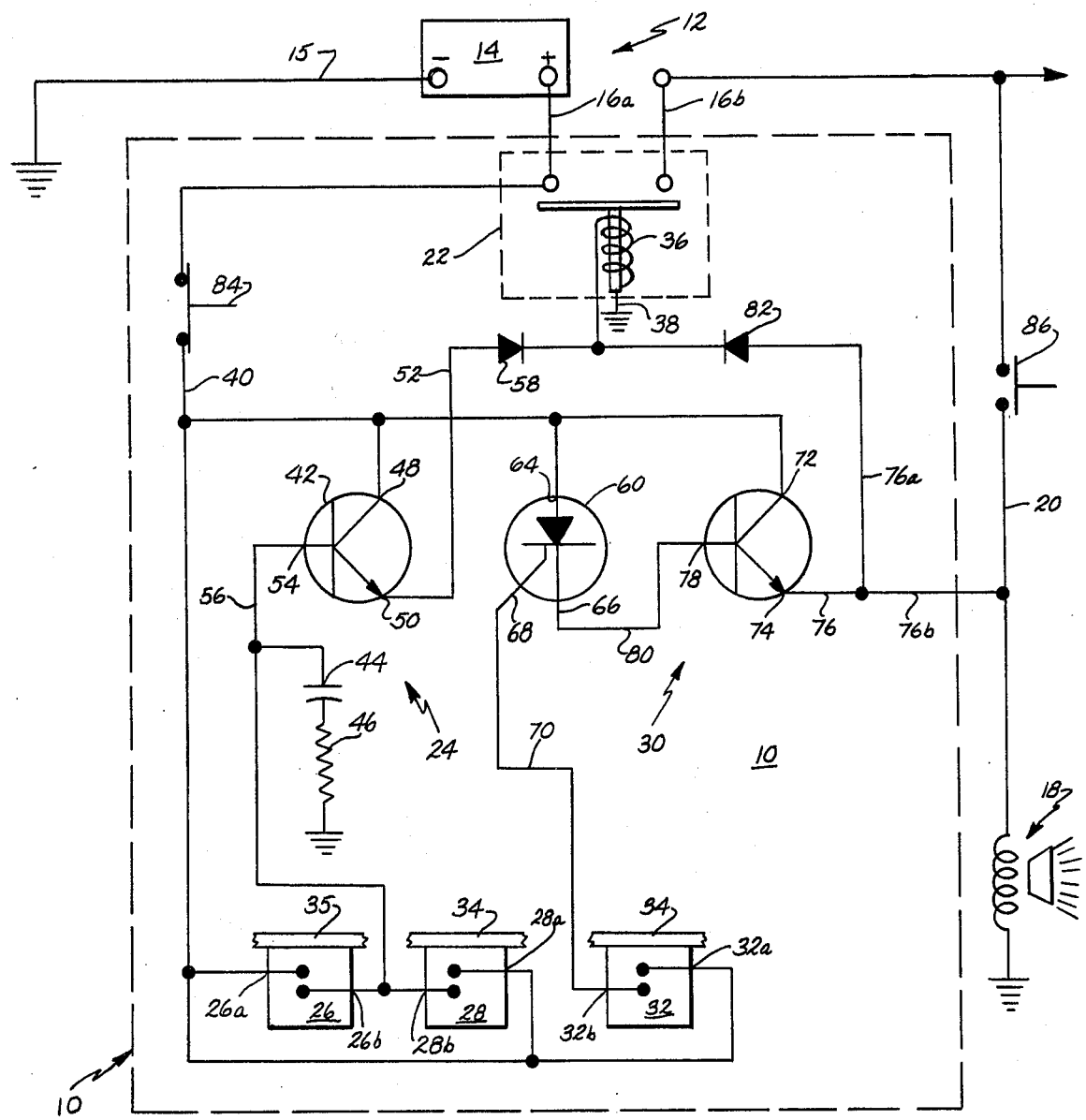
FIG. 1 is a schematic diagram of an automotive electrical system incorporating the battery control and alarm system of the present invention.

A battery control and alarm system in accordance with a preferred embodiment of the invention is illustrated in the drawings and generally designated 10. Control system 10 is shown installed on a vehicle electrical system 12 including battery 14, main cable 16 and a grounded horn 18. Control system 10 generally includes normally open, solenoid-actuated switch 22, delay circuit 24, switches 26 and 28 actuating switch 22 and delay circuit 24, emergency circuit 30 and switch 32 actuating circuit 30. All of switches 26, 28 and 32 are magnetically actuated reed switches capable of being turned on using a permanent magnet, for example, magnet 90, on key ring 88. Switch 26 is located on steering column 35 or proximate the vehicle ignition switch (not shown), whereas switches 28 and 32 are mounted on dashboard 34 proximate the windshield (not shown) so that the switches may be actuated from the exterior of the vehicle through the windshield or from the interior using a permanent magnet. Delay circuit 24 permits current to flow to solenoid-actuated switch 22 for a limited delay period after switches 26 and 28 are opened. Emergency circuit 30 supplies current to solenoid-actuated switch 22 and horn 18 when switch 32 is momentarily closed. Opening of switch 32 thereafter does not interrupt this flow of current. Consequently, the vehicle electrical system is enabled when any one of switches 26, 28 or 32 is closed and for a limited period of time after both of switches 26 and 28 are opened. Additionally, the vehicle electrical system is enabled and horn 18 is sounded when switch 32 is closed, even momentarily, the horn continuing to sound and the vehicle electrical system continuing to be activated until the system has been manually reset.

Because switch 22 is normally open, the vehicle electrical system 12 is enabled only when one of switches 26, 28 or 32 is first closed. Switch 26, located proximate the vehicle ignition switch, is most typically the switch closed to actuate solenoid 22, enabling electrical system 12. Delay circuit 24 insures that vehicle electrical system 12 remains enabled for a limited period of time after either of switches 26 or 28 is opened so that the driver may leave the vehicle lights on when exiting the vehicle to provide lighted access to a building. Switch 26, in accordance with an alternate embodiment of this invention, may be located in a concealed position within the vehicle. It could, for example, be positioned within the vehicle steering column or behind the dashboard. When so located, the metal in the holder of switch 26 the column or dashboard can function to retain magnet 90 in overlying and, thus, enabling position with respect to switch 26.

Switch 28, located proximate the vehicle windshield, may be closed using a permanent magnet from the exterior of the vehicle to perform the identical function of switch 26. This enables one to actuate the vehicle lights, interior or exterior, and other accessories left on from outside of the vehicle. Switch 32 is also located proximate the vehicle windshield and when closed supplies current to both horn 18 and switch 22 enabling vehicle system 12. Accordingly, when one believes himself to be in danger, he may close switch 32, actuating the vehicle accessories left on as well as horn 18.

Turning more specifically to the construction of battery control system 10, solenoid-actuated switch 22 is connected in series with cables 16a and 16b so as to be in series with all accessories on the vehicle powered by battery 14. Solenoid switch 22 is preferably interposed in the cable directly at the battery. When switch 22 is open, thus, current to all vehicle accessories will be "off". Switch 22 is normally open and includes a coil 36 which, when supplied with current, causes switch 22 to close, permitting current to flow from cable 16a to cable 16b. Coil 36 is grounded at 38.

Switches 26, 28 and 32 are magnetically actuated reed switches. As is well known, switches 26, 28 and 32 may all be actuated, that is, closed, by positioning a permanent magnet over an appropriate portion of the switch. Switch 26 is located proximate the ignition switch (not shown) of the vehicle so that it may easily be closed when the driver desires to start the vehicle. Since switch 26 must remain closed in order for the vehicle to operate continuously, it is preferably positioned in a metal holder on the steering column or dashboard closely adjacent the ignition switch. The magnet 90 is laid on the exterior of the holder closing switch 26. The magnetic forces will retain magnet 90 in this position until it is manually removed.

Switches 28 and 32 are located generally proximate one another and proximate the windshield (not shown) in the vehicle so that these switches may be actuated from outside of the vehicle. In the preferred embodiment, these switches are positioned on the left-hand side of the dashboard so as to be convenient to the operator as he approaches the vehicle. Preferably, a decal (not shown) is positioned on the vehicle window proximate switches 28 and 32 to identify them. Each of switches 26, 28 and 32 includes a terminal or contact 26a, 28a and 32a, respectively, connected through conductor 40 and cable 16a to battery 14.

Delay and actuating circuit 24 generally includes transistor, or controllable current control device, 42, capacitor 44 and grounded resistor 46. Transistor 42 of the preferred embodiment is an NPN transistor having a collector, or current input terminal, 48, connected through conductor 40 and cable 16a to battery 14; an emitter, or current output terminal, 50, connected through conductor 52 through diode 58 to coil 36; and a base, or control input terminal, 54, connected through conductor 56 to capacitor 44. Grounded resistor 46 is connected to capacitor 44 opposite base conductor 56. Additionally, conductor 56 interconnects base 54, a second terminal 26b on switch 26 and a second terminal 28b on switch 28.

Switches 26 and 28 are connected in parallel so that current is allowed to flow through conductor 56 to base 54 and capacitor 44 whenever either of the switches is closed. Diode 58 is connected in series with conductor 52 to prevent current from flowing from emergency circuit 30 to transistor 42.

Emergency circuit 30 includes silicon-controlled rectifier (SCR) 60 and transistor 62, both of which are controllable current control devices. SCR 60 includes anode, or current input terminal, 64, connected through conductor 40 and cable 16a to battery 14; cathode, or current output terminal, 66; and gate, or control input terminal 68, connected through conductor 70 to second terminal 32b on switch 32. Transistor 62 in the preferred embodiment is an NPN transistor having collector, or current input terminal, 72, connected through conductor 40 and cable 16a to battery 14; emitter, or current output terminal, 74, connected through conductor 76 to both coil 36 and horn 18; and base, or control input terminal, 78, connected through conductor 80 to cathode 66 of SCR 60. Diode 82 is connected in series with conductor 76a to insure that current does not flow from transistor 42 to transistor 62 and horn 18.

Additionally, normally closed switch 84 is connected in series with conductor 40. When switch 84 is open, current cannot flow through conductor 40 to transistors 42 and 62 and SCR 60; consequently, vehicle electrical system 12 is disabled because current is not supplied to coil 36. Preferably, switch 84 is located at some point on the vehicle exterior under the hood of the vehicle to be accessible from the outside of the vehicle. It is utilized to deactivate emergency circuit 30, as will be pointed out hereinafter.

Finally, normally open horn button 86 is connected in series with conductor 20 so that horn 18 may be actuated in the normal manner from the interior of the vehicle. Generally, horn button 86 is mounted on the steering wheel (not shown) of the vehicle and, when depressed, allows current to flow through conductor 20 to horn 18 to sound the horn.

Figure 2:
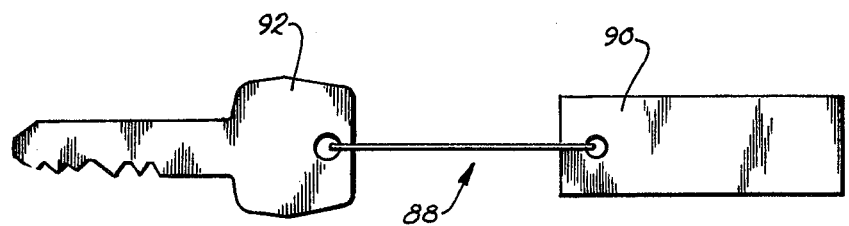
FIG. 2 is a view of a key ring to be used in conjunction with the battery control and alarm system.

In the preferred embodiment, key ring 88 (FIG. 2) used in conjunction with a vehicle incorporating control system 10 includes a permanent magnet 90 for actuating all of magnetically actuated reed switches 26, 28 and 32. Of course, other permanent magnets may also be used.

OPERATION

When control system 10 is in its normally disabling state with all of switches 22, 26, 28 and 32 open, vehicle electrical system 12 and, more particularly, battery 14 are disabled so that none of the vehicle accessories connected to cable 16b can be operated. This insures that no current will inadvertently be drawn from battery 14 when the vehicle is inoperative.

The most frequently actuated of switches 26, 28 and 32 is switch 26 located proximate the vehicle ignition switch. When the driver desires to start the vehicle, he positions permanent magnet 90 in key ring 88 over switch 26 to close the switch. Current then flows from battery 14 through cable 16a, conductor 40, switch 26 and conductor 56 to both base 54 and capacitor 44. This current charges capacitor 44 and biases transistor 42, permitting current to flow through the transistor from collector 48 to emitter 50 and consequently through conductor 52 to coil 36. When so supplied with the sufficient current required to actuate solenoid switch 22, switch 22 closes, completing the connection between cables 16a and 16b so that current is available to all vehicle accessories connected to cable 16b. Most notably, the vehicle ignition system (not shown) and starter motor (not shown) or solenoid (not shown) are connected to cable 16b and thereby enabled by the closure of switch 22.

When operation of the vehicle is terminated, the driver removes ignition key 92 from the ignition switch and permanent magnet 90 from over switch 26 to open the switch. However, because capacitor 44 is charged, it continues to supply a biasing current to transistor 42. Capacitor 44 dissipates its charge through transistor 42. Consequently, capacitor 44 continues to supply current to base 54 for a limited delay period after switch 26 is opened so that transistor 52 continues to permit current to flow to coil 36 to maintain switch 22 in its closed position. After the limited time has expired, capacitor 44 becomes discharged, turning off transistor 42, opening switch 22 and thus disabling the vehicle electrical system 12. This delay period allows the driver to leave the vehicle lights on so that he may gain safe entrance to a building before the lights are automatically extinguished by switch 22. When switch 22 is open, the entire vehicle electrical system 12 is disabled so that no accessory can drain current from battery 14.

Switch 28, located on dashboard 34 proximate the vehicle windshield, may be actuated using permanent magnet 90 from a position exterior of the vehicle. Switch 28, connected in parallel with switch 26, performs exactly the same function as switch 26, i.e., enabling and disabling vehicle electrical system 12. However, sometimes it is desirable to actuate the vehicle accessories from outside of the vehicle, and switch 28 provides a means of accomplishing this. Switch 28 may be utilized, for example, to activate the interior lights of the vehicle (previously switched to "on" within the vehicle) from the exterior, permitting the driver to examine the vehicle interior prior to entry.

Switch 32 may be closed from outside or inside of the vehicle using permanent magnet 90, most typically when one believes himself to be in danger. Switch 32, when closed, causes control system 10 to both enable the vehicle electrical system 12 and supply current to horn 18 to sound the horn. When switch 32 is closed, more particularly, current flows from battery 14 through cable 16a, conductor 40, switch 32 and conductor 70 to gate 68, triggering SCR 60, permitting current to flow through the SCR from anode 64 to cathode 66. Once triggered, SCR 60 will continue to conduct current from anode 64 to cathode 66 until the current is interrupted by manually opening switch 84. The current flowing from cathode 66 through conductor 80 biases transistor 62 at base 78. With base 78 so biased, transistor 62 conducts current from conductor 40 through collector 72 and emitter 74 to conductor 76. This current flows through conductor 76a to coil 36 to close switch 22 and through conductor 76b to horn 18 to sound the horn. Consequently, one may draw attention to a dangerous situation by closing switch 32 enabling any vehicle accessories left in an "on" condition and positively sounding horn 18. Vehicle electrical system 12 will be enabled and horn 18 will sound until the current supply to SCR 60 is interrupted by opening switch 84. Consequently, if one closes and then in a scuffle inadvertently opens switch 32 by removing the magnet, horn 18 will continue to sound until switch 84 is opened. Diode 82 insures that the horn will not be sounded when delay circuit 24 conducts current to coil 36. Likewise, diode 58 insures that emitter 50 will not be improperly biased when horn actuating circuit 30 supplies current to coil 36.

The battery control and alarm system of the present invention provides a means whereby the entire vehicle electrical system is disabled after a limited period of time after the driver exits the car. By disabling the entire electrical system, and not merely the lights, battery 14 is fully protected against unwanted drain. Further, the system includes a second switch for initiating the delay period from outside of the vehicle. The control system also includes means for enabling the vehicle electrical system and positively sounding the horn, for example, whenever one believes himself to be in danger to attract attention to the vehicle area. Finally, the specific circuitry for the delay circuit includes a minimum number of parts to effectuate the delay period.

It should be understood that the above description is intended to be that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A delay battery control system for a vehicle having a battery and a cable for conducting current from the battery, said control system comprising:
    a normally open main switch in series with the cable, said main switch having an enablement terminal, said main switch closing upon the application of current to said enablement terminal;
    a normally open ignition switch circuit connected in series between the battery and said main switch enablement terminal, said ignition switch circuit being activatable by the vehicle driver;
    means for delaying opening of said main switch for a predetermined time period following opening of said ignition switch circuit; and
    a normally open accessory-enabling switch connected in series between the current source and said main switch enablement terminal, said accessory-enabling switch being activatable from the vehicle exterior.

2. A system as defined in claim 1 wherein said ignition switch circuit and said accessory-enabling switch each comprise a magnetically actuated reed switch.

3. A delay battery control system for a vehicle having a battery and a cable for conducting current from the battery, said control system comprising:
    a normally open main switch in series with the cable, said main switch having an enablement terminal, said main switch closing upon the application of current to said enablement terminal;
    a normally open ignition switch circuit connected in series between the battery and said main switch enablement terminal, said ignition switch circuit being activatable by the vehicle driver, said ignition switch circuit comprising a magnetically actuated reed switch; and means for delaying opening of said main switch for a predetermined time period following opening of said ignition switch circuit.

4. A system as defined in claim 3 wherein said ignition reed switch is located proximate the vehicle ignition switch to be actuated by a permanent magnet connected to the vehicle ignition key.

5. A battery control and alarm system for a vehicle having a battery, a cable for conducting current from the battery, and a horn, said system comprising:

a normally open main switch in series with the cable, said main switch having an enablement terminal, said main switch closing upon the application of current to its enablement terminal;

a normally open ignition switch circuit connected in series between the current source and said main switch enablement terminal, said ignition switch circuit being activatable by the vehicle driver;

means for delaying opening of said main switch for a predetermined time period following opening of said ignition switch; and a normally open emergency switch circuit connected in series between the current source and said main switch enablement terminal and in series between the current source and the horn, said emergency switch circuit being activatable from the vehicle exterior to activate the horn and to supply current to said main switch enablement terminal.

6. A system as defined in claim 5 which further comprises means for maintaining the supply of current to the horn after opening of said emergency switch circuit whereby the horn will continue to sound.

7. A system as defined in claim 6 wherein:

said ignition switch circuit comprises a first, normally open switch connected in series between the current source and said main switch enablement terminal, said first switch having an enablement terminal, said first switch closing upon the application of current to its enablement terminal; and wherein said emergency switch circuit comprises:

a second, normally open switch connected in series between the current source and said main switch enablement terminal and between the current source and the horn, said second switch having an enablement terminal, said second switch closing upon the application of electrical current to its enablement terminal; and a third, normally open switch connected in series between the current source and said second switch enablement terminal, said third switch having an enablement terminal, said third switch closing upon the application of current to its enablement terminal.

8. A system as defined in claim 7 wherein said main switch comprises a solenoid, said first and second switches comprise transistors, and said third switch comprises a silicon-controlled rectifier.

9. A system as defined in claim 5 wherein said ignition switch circuit comprises a normally open accessory-enabling switch connected in series between the current source and said main switch enablement terminal, said accessory-enabling switch being activatable from the vehicle exterior.

10. A system as defined in claim 9 wherein said ignition switch circuit, said emergency switch circuit, and said accessory-enabling switch each comprise a magnetically actuated reed switch.

11. A system as defined in claim 10 wherein said emergency switch circuit reed switch and said accessory-enabling reed switch are located proximate a vehicle window.

12. A system as defined in claim 5 wherein said ignition switch circuit and said emergency switch circuit each comprise a magnetically actuated reed switch.

13. A system as defined in claim 12 wherein said ignition switch circuit reed switch is located proximate the vehicle ignition switch to be actuated by a permanent magnet connected to the vehicle ignition key.

* * * * *